Patented Mar. 30, 1954

2,673,808

UNITED STATES PATENT OFFICE 2,673,808

GLASS BATCH AND ARTICLE THEREFROM

Max Meth, Atlantic City, N. J.

No Drawing. Application December 18, 1950,
Serial No. 201,485

10 Claims. (Cl. 106—40)

This invention relates to the composition of a glass and has for its object to provide a new formula by which glass possessing novel characteristics may be produced.

A principal object of the invention is to teach the manufacture of an aerated glass which will have excellent heat insulating properties, which will not check or crack when opposite sides thereof are subjected to a rather wide temperature differential and which lends itself to numerous commercial applications requiring good structural properties.

Another object is to provide a novel glass, as above described, which may be manufactured with conventional glass making equipment at temperatures of usual glass making methods and, further, which may be worked as by rolling, molding or blowing at conventional working temperatures.

More specifically, it is an object of this invention to provide a glass which will be in the nature of a ceramic mixed with organics which are burned out during the initial melting stage and which will leave voids which will appear as bubbles in the glass. The insulating value of the resultant product will depend to a great extent upon the number of bubbles present and the thickness of the walls separating the bubbles. As will be hereinafter explained, the number and size of the bubbles may be varied to meet a range of specifications so that it becomes possible to manufacture building bricks, for instance, which will be translucent, strong, good heat insulators and of relatively light weight. It becomes possible also to manufacture roofing slabs, wall partitions and other articles having the above qualities.

While I am aware that aerated glass may be found on the market, it is made either by mechanically introducing bubbles into the glass while molten, or it is found in a form in which the glass has largely lost all structural strength. Glass made according to my invention retains all of the strength of ordinary lime glass and has the further property of providing, for molded or rolled articles, a smooth, unbroken exterior skin or surface which encloses the mass of voids or bubbles.

Ordinary glass may be broadly described as being composed, by weight, of one hundred parts of sand, thirty-five parts of feldspar, about twenty parts of calcium carbonate, about five parts of sodium carbonate, and other chemicals as may be desired as a base. These materials become molten at temperatures around 2600° F. and are worked at temperatures around 2100° F. into flat-rolled, formed, molded or blown products. A batch of this type will become molten and ready for working in twelve to fifteen hours during which time the formed or released gases escape. As the glass is progressively withdrawn from the furnace additional amounts of batch are added to the top of the mass so that continuous operation is obtained.

The glass constituting this invention may be described as compounded, by weight, of one hundred parts of sand, one hundred parts of sodium carbonate, one hundred parts of feldspar, and coloring matter, if desired. A batch so constituted will become similarly molten at a temperature around 2600° F. and may be worked at temperatures around 2100° F. The time to melt the batch and to bring it to condition for working will be similarly twelve to fifteen hours, but the gases released by the raw materials during the melting will not escape. They will form a great multiplicity of bubbles in the mass, the vast majority of which will range in size from $\frac{1}{16}$" to $\frac{1}{4}$" in diameter. The bubbles will occur in such profusion that the amount of glass separating them will be quite thin.

The proportions of the above formula may be changed by adding or subtracting ten percent of the weight of the sodium carbonate, preferably with a corresponding increase or decrease in the weight of the feldspar. The result of these variations will be to increase or to decrease the size of the bubbles formed more or less in proportion to the degree of departure from the original formula. Increase in the percentage of the feldspar increases the total aeration. While, from a chemical standpoint, the range of variation may be further increased, it may not greatly be increased from a practical standpoint for the reason that increase in the melting temperature and an increase in the working temperature will then become necessary. While this is also theoretically possible and may be done under exceptional circumstances, the added expense thereby entailed would be prohibitive for all ordinary purposes when carried to the extremes of the theoretical limits, so that the limits of variation above recited are well founded in actual practice.

Feldspar has been recited as an essential ingredient of the above formula, but it is possible to substitute therefor nepheline syenite which has a composition similar to many of the forms of feldspar except that the proportion of aluminum runs higher, although feldspar is superior for all uses to which I presently contemplate putting this glass. While the formula of feldspar varies rather widely depending on its environment and origin, the following represents one example which I have successfully used: silica sixty parts, alumina twenty parts, sodium oxide fifteen parts, and traces of iron. It may be possible to introduce these elements individually and in these general proportions, into the batch instead of feldspar, although such practice is not recommended.

When this glass is worked as by rolling, molding or blowing, and cooled the gases which formed the bubbles then cool so that the bubbles are thereafter in a state of low pressure approaching a void or vacuum, but each will contain a small quantity of those gases. The combination of the voids and thin walls separating them offers great resistance to heat transmission. On the other hand, if a brick or a roofing slab is formed and subjected on one side to the heat of the sun, the continuous skin constituting the exterior thereof will serve as a heat path to prevent localized building up of temperature. It is probably for this reason that bricks and roofing slabs formed of this material do not crack under changing weather conditions as do similar articles made from conventional glass. Such products are much lighter in weight and easier to handle and also more economical to transport than if made of solid glass.

Various other articles may be made with this glass and the method of manufacture and other conditions may be readily adapted thereto by those skilled in the art. I therefore desire to be extended protection as defined by the appended claims.

What I claim is:

1. The method of making glass which consists in making a batch composed susbtantially of equal parts by weight of sand, sodium carbonate and an alkaline aluminum silicate material and in subjecting said batch to temperatures around 2600° F. for twelve to fifteen hours and in then withdrawing the resultant product from the zone where heat is applied for working.

2. The method of making glass which consists in making a batch composed substantially of equal parts by weight of sand, sodium carbonate and feldspar and in subjecting said batch to temperatures around 2600° F. until thoroughly molten and in then withdrawing the resultant mass from the heating zone and in working said mass.

3. The method of making glass which consists in subjecting a batch composed of one hundred parts by weight of sand, ninety to one hundred and ten parts of sodium carbonate and one hundred and ten to ninety parts of an alkaline aluminum silicate material to temperatures of the order of 2600° F. for a sufficient time to reduce to a thoroughly molten condition and then in withdrawing the resultant product from the heating zone and in working the said product.

4. A raw material batch for making aerated glass composed of equal parts by weight of sand, sodium carbonate and feldspar.

5. A raw material batch for making aerated glass composed of one hundred parts by weight of sand, ninety to one hundred ten parts of sodium carbonate and one hundred and ten to ninety parts of feldspar, the total batch being composed of about three hundred of said parts.

6. As an article of manufacture, an aerated glass object having a mass of bubbles therein separated by thin walls, said article having a continuous, smooth exterior surface and being of substantially uniform apparent color.

7. As an article of manufacture a glass having a great multiplicity of bubbles each containing a minute quantity of gas released by the raw materials of which the glass is composed.

8. As an article of manufacture, glass having a great multiplicity of bubbles entrapped therein, each of said bubbles containing a minute quantity of the gases released by the raw materials from which the glass is made, the glass walls enveloping each of said bubbles being transparent and having substantial structural strength.

9. A glass brick containing a great multiplicity of bubbles separated by wall spaces, said bubbles being in such profusion and said wall spaces being so thin, that said brick is translucent but non-transparent at any point, said brick having continuous exterior surfaces smooth to the touch.

10. A glass article having a great profusion of bubbles separated by thin wall spaces, each of said bubbles containing a minute amount of gases released by the raw materials from which said article is made, during the molten manufacture thereof, said bubbles being free of air, the glass walls enveloping each of said bubbles being transparent and having substantial weight carrying ability.

MAX METH.

References Cited in the file of this patent

UNITED STATES PATENTS

| Number | Name | Date |
|---|---|---|
| 1,332,058 | Musial | Feb. 24, 1920 |
| 2,224,493 | Taylor | Dec. 10, 1940 |
| 2,237,037 | Lytle | Apr. 1, 1941 |
| 2,255,236 | Willis | Sept. 9, 1941 |
| 2,306,310 | Haux | Dec. 22, 1942 |
| 2,322,581 | Lytle | June 22, 1943 |
| 2,544,954 | Ford | Mar. 13, 1951 |

FOREIGN PATENTS

| Number | Country | Date |
|---|---|---|
| 404,442 | Germany | 1924 |